UNITED STATES PATENT OFFICE 2,346,547

ALPHA-PRIMARY AMINO CARBOXYLIC ACID

Witty Lysle Alderson, Jr., Wilmington, Del., assignor to E. I. du Pont de Nemours & Company, Wilmington, Del., a corporation of Delaware No Drawing. Application December 5, 1941, Serial No. 421,843

6 Claims. (Cl. 260—534)

This invention relates to the preparation of alpha-amino acids and more particularly to the preparation of glycine.

Alpha-amino acids occur in combination in nature in the form of proteins. The alpha-amino acids themselves are, however, of rare occurrence and the proteins are usually combinations of a number of amino acids so that the proteins are in general not convenient sources of the pure amino acids. Certain of these acids have uses, e. g., in diagen base stabilizers and as intermediates in the synthesis of surface active agents and corrosion inhibitors. If made cheaply enough from a non-protein source, they could even be used as protein substitutes, e. g., in poultry and live stock feeds.

This invention has as an object the provision of a practical and convenient method for preparing alpha-primary amino carboxylic acids. Another object is the preparation of new intermediates. A further object is the provision of a new process for the preparation of glycine. Other objects will appear hereinafter.

These objects are accomplished by the following invention where substantially equivalent quantities of a metal cyanide and a metal salt of a primary aminomethanesulfonic acid are reacted in aqueous solution at a temperature in the range 20–80° C. for about half an hour.

The term "an aminomethanesulfonic acid" represents a compound of the formula

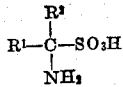

wherein $R^1$ and $R^2$ are hydrogen or monovalent hydrocarbon radicals which may be interrupted by oxygen, sulfur, or nitrogen linkages or may be unsubstituted or substituted with hydroxyl, amino, alkoxyl or like groups which are unreactive under the conditions of the reaction. The final products of the process of this invention are alpha-primary amino carboxylic acids.

The process of this invention may be carried out as follows:

Equimolar amounts of a water-soluble metallic cyanide such as sodium cyanide, and an alkali metal salt of the aminomethanesulfonic acid are reacted in aqueous solution at 40–50° C. for about half an hour. The reaction mixture is then acidified with an excess of a volatile mineral acid, such as concentrated hydrochloric acid, and refluxed for three to four hours after which water and excess acid are removed by evaporation and the dry residue is extracted with several portions of hot absolute alcohol to remove the amino carboxylic acid salt from the inorganic salts present. The free amino carboxylic acid may be obtained by adding aniline, which is more basic than the amino acid, to the combined alcohol extracts in order to liberate the amino carboxylic acid from its acid salt. The free amino carboxylic acid is substantially insoluble in absolute alcohol and may be filtered off directly. When a hydrogen halide is used to carry out the hydrolysis, the free amino carboxylic acid can be conveniently liberated from its hydrohalide by refluxing the alcoholic solution of the latter with pinene as disclosed in greater detail in copending application Serial No. 415,487, filed October 17, 1941, by Paul Austin. The amino acid is gradually precipitated as an insoluble powder. If a non-volatile mineral acid, such as sulfuric acid, is used to carry out the hydrolysis, the free amino carboxylic acid may be obtained by adding a sufficient amount of barium hydroxide to the acid hydrolyzate to neutralize all the mineral acid present and to liberate the amino acid from its acid salts, then removing the insoluble barium sulfate and evaporating the remaining solution of the free amino carboxylic acid to dryness. The amino acid may also be be separated by adding lead monoxide and treating the suspended lead salt with hydrogen sulfide.

Another modification of the process of this invention consists in treating an aqueous solution of an hydroxymethanesulfonic acid alkali metal salt, prepared from an aldehyde or ketone and an alkali metal bisulfite, first with ammonia and then with a metal cyanide, heating the mixture to about 50° C. for 30–120 min., then hydrolyzing the mixture to obtain an alpha-primary amino carboxylic acid as previously described. However, a purer end product is obtained if the selected aminomethanesulfonic acid is isolated prior to the treatment of its alkali metal salt with an alkali metal cyanide.

A particularly desirable source of aminomethanesulfonic acids is the reaction of a technical grade of ammonia, with suitable aliphatic, aryl or arylaliphatic aldehydes or ketones and sodium bisulfite. The directions for the preparation of such compounds given by Raschig and Prahl (Ann. 448, 287, (1926)) and H. McIlwain (Jour. Chem. Soc. 1941, 75) are particularly useful. Also any technical grade of inorganic acid and any grade of technical metal cyanide may be used.

The more detailed practice of the invention is illustrated by the following examples, wherein parts given are by weight. There are of course many forms of the invention other than these specific embodiments.

*Example I*

To a solution containing 50 parts (0.45 mol) of aminomethanesulfonic acid, 18 parts (0.45 mol) of sodium hydroxide and 100 parts of water is added 22 parts (0.45 mol) of sodium cyanide. The mixture is heated for 30 minutes at 50° C. after which it is cautiously acidified with 250 parts of concentrated 20.2% hydrochloric acid and refluxed for 3 to 4 hours. The water and excess acid are removed by distillation and the dry residue is extracted with several portions of hot absolute ethyl alcohol in order to separate the soluble glycine hydrochloride from insoluble inorganic salts. The addition of aniline to the combined alcohol extracts causes 20 parts of substantially pure glycine to precipitate which represents a yield of 60% of the theoretical amount. Another method of liberating glycine from the alcohol solution of its hydrochloride consists in adding an excess of pinene to the combined alcohol extracts and refluxing the mixture for several hours. The glycine is precipitated as a fine white powder.

Analysis of the glycine obtained by this process gave the following results: Calculated for $C_2H_5O_2N$: N, 18.66. Found: N, 18.58, 18.70.

*Example II*

A solution of 22.5 parts of alpha-aminoethanesulfonic acid, 7 parts of sodium hydroxide and 8.4 parts of sodium cyanide in 100 parts of water is heated for 30 min. at 50–60° C. After acidification with 175 parts of constant boiling hydrochloric acid (20.2%), the solution is refluxed for 3–4 hours and then evaporated to dryness. The dry residue is extracted with several portions of hot absolute ethyl alcohol and alpha-alanine is precipitated from the combined extracts by the addition of aniline. In this manner 15.5 parts of crude alpha-alanine, melting at 220° C. (uncorrected) is obtained which represents 95% of the theoretical yield. Recrystallization of the product from aqueous alcohol raises the melting point to a temperature near the reported melting point of 290° C. (corrected). Analysis: Calculated for $C_3H_8O_2N$: N, 15.55. Found: N, 15.33, 15.22.

*Example III*

Thirty-five parts of C-phenylaminomethanesulfonic acid is added to a solution of 7.5 parts of sodium hydroxide and 8.5 parts of sodium cyanide in 100 parts of water. The temperature of the solution is maintained at 40–50° C. for 30 to 45 min. during which time a considerable amount of an insoluble oil is formed. After acidifying with 250 parts of constant boiling hydrochloric acid (20.2%), the mixture is refluxed for 3–4 hours and then evaporated to dryness. The dry residue is extracted with several portions of hot absolute ethyl alcohol and C-phenylglycine is precipitated from the combined extracts by the addition of aniline. In this manner 12 parts of C-phenylglycine melting at 240° C. is obtained which represents 46% of the theoretical amount. Analysis: Calculated for $C_8H_8O_2N$: N, 9.93. Found N; 9.55, 9.51.

The foregoing examples illustrate preferred embodiments of the invention in the preparation of selected alpha-amino carboxylic acids. Other alpha-primary amino carboxylic acids may be prepared by reacting water soluble substituted aminomethanesulfonic acid salts with substantially one equivalent of a water soluble metal cyanide.

The invention is applicable to aminomethanesulfonic acid and substituted aminomethanesulfonic acids of the formula $$R^1-\underset{\underset{NH_2}{|}}{\overset{\overset{R^2}{|}}{C}}-SO_3H$$

wherein $R^1$ and $R^2$ represent hydrogen or a monovalent hydrocarbon radical which may be unsubstituted or substituted with groups which are unreactive under the conditions of the reaction. A particularly useful class of aminomethanesulfonic acids includes those prepared by reacting a ketaldonyl compound, i. e., an aldehyde or a ketone, with an alkali metal bisulfite and ammonia as indicated above. Aldehydes and methyl ketones, i. e., compounds of the formulae R—CHO and R—CO—CH$_3$ are particularly preferred because of the ease of preparation and desirable yields in the reaction with sodium bisulfite. Typical examples of such compounds are: formaldehyde, acetaldehyde, propionaldehyde, butyraldehyde, benzaldehyde, piperonal, acetone, methyl ethyl ketone, cyclohexanone, and hydroxyacetone.

Although the preferred embodiment of this invention calls for the isolation of the selected aminosulfonic acid prior to the treatment of its metal salt with a suitable metal cyanide, it is not necessary to do so. Instead a solution of an alkali metal aminomethanesulfonate may first be prepared by treating a solution of a ketone or aldehyde bisulfite addition product with ammonia and then adding the metal cyanide directly to this solution and proceeding as described in Example I. Nevertheless, it is desirable to isolate the aminomethanesulfonic acid prior to the treatment of its salt with cyanide, because when this is done the final product is obtained in a high state of purity.

If the selected aminomethanesulfonic acid is isolated it may be transformed into a suitable metal salt by dissolving it in an aqueous solution of a metal hydroxide. It is usually desirable to form the metal aminomethanesulfonate before adding the metal cyanide; however, if desired, the mode of addition may be reversed, that is, the aminomethanesulfonic acid may be added to an aqueous solution of a metal cyanide and metal hydroxide.

Alkali metal salts of aminomethanesulfonic acids are preferred because they are easy to prepare and are more readily available. However, any water-soluble salt, other than the ammonium salt, of an aminomethanesulfonic acid is operable.

Operable metal cyanides are those which are at least as soluble in water as calcium cyanide. Usually alkali metal cyanides are preferred because of their greater solubility and lower cost. The following cyanides are typical examples of those which may be used in this process: Sodium cyanide, potassium cyanide, barium cyanide, cadmium cyanide, and calcium cyanide. Substantially one equivalent of metal cyanide should be present per mole of the aminomethanesulfonic acid salt.

The operable temperature range is from 0° to 100° C. and preferably in the immediate neighborhood of 50° C. If temperatures above 100° C.

are used only traces of the desired product are obtained and at temperatures near 0° C. the reaction takes place very slowly and is further hampered by the low solubility of the reactants. At the preferred temperature, i. e., in the neighborhood of 50° C., a reaction time of from 30 to 120 minutes is sufficient to bring the reaction to completion.

The preferred solvent is water and the amount used will vary with the solubility of the reactants at the given temperatures. In general, only enough water should be present to form a saturated solution of the reactants. A large excess of solvent lowers the yield of the final product. In some cases, particularly with the salts of long chain aminomethane-sulfonic acids, aqueous alcohol may be used as a solvent; however, as a rule best results are obtained with water.

The hydrolysis of the products formed by reaction of the selected aminomethanesulfonic acid salt and metal cyanide may be carried out with any acid whose ionization constant at 25° C. is at least $1.86 \times 10^{-5}$. It is preferable however to use strong inorganic acids, especially volatile inorganic acids such as hydrochloric acid, because this type of acid greatly simplifies the procedure of isolating the final product. The hydrolysis may also be carried out with alkali but this is not desirable because it introduces additional manipulation during the isolation of the alpha-amino carboxylic acid.

Liberation of the alpha-amino carboxylic acids from their acid salts may be accomplished by any of the methods described in the literature. Another convenient method for accomplishing this consists in refluxing an alcoholic solution of the hydrochloride salt of the alpha-amino carboxylic acid with an excess of pinene. The free acid is precipitated as a white insoluble powder.

Primary alpha-amino acids may be used as protein substitutes in poultry and livestock feeds. They are also useful as diagen-base stabilizers and as intermediates in the synthesis of surface active agents and corrosion inhibitors.

In the specification and claims, the term "amino" means the primary amino group $-NH_2$.

In the specification and claims, the term "equivalent" is used to designate one molecular weight of an aminomethanesulfonic acid or a monovalent metal salt thereof, one molecular weight of an alkali cyanide or other cyanide of a monovalent metal, one-half molecular weight of an alkaline earth cyanide or other cyanide of a bivalent metal, one-half molecular weight of a bivalent metal salt of an aminomethanesulfonic acid, etc.

The above description and examples are intended to be illustrative only. Any modification of or variation therefrom which conforms to the spirit of the invention is intended to be included within the scope of the claims.

What is claimed is:

1. A process for the preparation of glycine which comprises heating an aqueous solution prepared from 18 parts of sodium hydroxide, 50 parts of aminomethanesulfonic acid, $$H_2NCH_2SO_3H$$

22 parts of sodium cyanide and 100 parts of water for 30 minutes at 50° C., adding to the solution 250 parts of 20.2% aqueous hydrochloric acid, refluxing for three hours, evaporating the solution to dryness and extracting the glycine hydrochloride with absolute ethyl alcohol.

2. A process for the preparation of glycine which comprises reacting one mol of sodium aminomethanesulfonate with substantially one mole of sodium cyanide in substantially saturated aqueous solution at 20–80° C. for one-half hour, adding an excess of an acid of ionization constant of at least $1.86 \times 10^{-5}$, heating the solution until hydrolysis is complete, evaporating to dryness and extracting the glycine salt with absolute ethanol.

3. Process for the preparation of an alpha-primary amino carboxylic acid which comprises reacting at 20–80° C. for 0.5 to 2 hours, in approximately saturated aqueous solution substantially equivalent quantities of a water soluble metallic cyanide and a metal salt of an amino sulfonic acid having the amino and sulfonic acid groups on the same only singly bonded carbon atom, and then hydrolyzing the product.

4. In the process of preparing an alpha-primary amino carboxylic acid, the step which comprises reacting one equivalent of a metal salt of an aminomethanesulfonic acid with one equivalent of a water soluble metallic cyanide in approximately saturated aqueous solution at 20–80° C. for approximately one-half hour.

5. In the process of preparing an alpha-primary amino carboxylic acid, the step which comprises reacting one equivalent of a metal salt of an aminomethanesulfonic acid with one equivalent of a water soluble metallic cyanide in approximately saturated aqueous solution at 20–80° C., and thereafter hydrolyzing the reaction product.

6. In the process of preparing an alpha-primary amino carboxylic acid, the step which comprises reacting approximately equimolar quantities of an alkali metal cyanide and an alkali metal salt of an aminomethanesulfonic acid in approximately saturated aqueous solution at 20–80° C., and thereafter hydrolyzing the reaction product.

WITTY LYSLE ALDERSON, Jr.